(12) United States Patent
Meier et al.

(10) Patent No.: US 7,377,072 B2
(45) Date of Patent: May 27, 2008

(54) BAIT STATION

(75) Inventors: Maude Christian Meier, Racine, WI (US); Dirk K. Nickel, Mukwonago, WI (US); Donald J. Schumacher, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 112 days.

(21) Appl. No.: 11/141,634

(22) Filed: May 31, 2005

(65) Prior Publication Data

US 2006/0265944 A1    Nov. 30, 2006

(51) Int. Cl.
*A01M 1/20* (2006.01)
(52) U.S. Cl. ......................................................... 43/131
(58) Field of Classification Search ................... 43/131
See application file for complete search history.

(56) References Cited

U.S. PATENT DOCUMENTS

| | | | |
|---|---|---|---|
| 2,650,451 A * | 9/1953 | Karstedt .................. | 43/131 |
| 2,683,953 A * | 7/1954 | Hopkins ................... | 43/131 |
| 5,595,746 A | 1/1997 | Milner et al. | |
| 5,832,658 A | 11/1998 | Randon | |
| 5,899,018 A | 5/1999 | Gordon et al. | |
| 5,927,001 A | 7/1999 | Ballard et al. | |
| 5,937,571 A | 8/1999 | Megargle et al. | |
| 5,950,356 A | 9/1999 | Nimocks | |
| 5,953,854 A | 9/1999 | Hyatt | |
| 6,016,625 A | 1/2000 | Bishoff et al. | |
| 6,058,646 A | 5/2000 | Bishoff et al. | |
| 6,079,151 A | 6/2000 | Bishoff et al. | |
| 6,158,166 A | 12/2000 | Snell et al. | |
| 6,164,010 A | 12/2000 | Snell et al. | |
| 6,195,934 B1 | 3/2001 | Megargle et al. | |
| 6,205,701 B1 | 3/2001 | Nimocks, III | |
| 6,235,301 B1 | 5/2001 | Ballard et al. | |
| 6,370,812 B1 | 4/2002 | Burns et al. | |
| 6,389,741 B2 | 5/2002 | Nimocks, III | |
| 6,397,516 B1 | 6/2002 | Su | |
| 6,606,817 B2 * | 8/2003 | Oi et al. ..................... | 43/131 |
| 6,615,535 B2 | 9/2003 | Snell et al. | |
| 6,660,290 B1 | 12/2003 | Stamets | |
| 6,691,453 B1 | 2/2004 | Rojas et al. | |
| 7,051,473 B2 * | 5/2006 | Hoppe et al. .............. | 43/131 |
| 2001/0025447 A1 | 10/2001 | Nimocks, III | |
| 2002/0023382 A1 | 2/2002 | Snell et al. | |
| 2002/0116866 A1 | 8/2002 | Aesch et al. | |
| 2002/0134003 A1 | 9/2002 | Oi et al. | |
| 2005/0102890 A1 | 5/2005 | Hoppe et al. | |

* cited by examiner

*Primary Examiner*—Kurt Rowan

(57) ABSTRACT

Bait stations are provided which present the ability to monitor bait and expand capacity of bait without materially adversely affecting feeding activity. In one form a slow acting toxicant-laced attractant is provided in the station. The station has an outer housing, an openable opaque lid, and a transparent window moveable relative to both the lid and housing. One can move the lid while leaving the window in place, or move both the lid and window. Removal of both permits attachment of a second such housing to the first, while the first remains in place. The lid and window can then be affixed to the second housing. These stations can be used to control termites and other crawling pests.

5 Claims, 5 Drawing Sheets

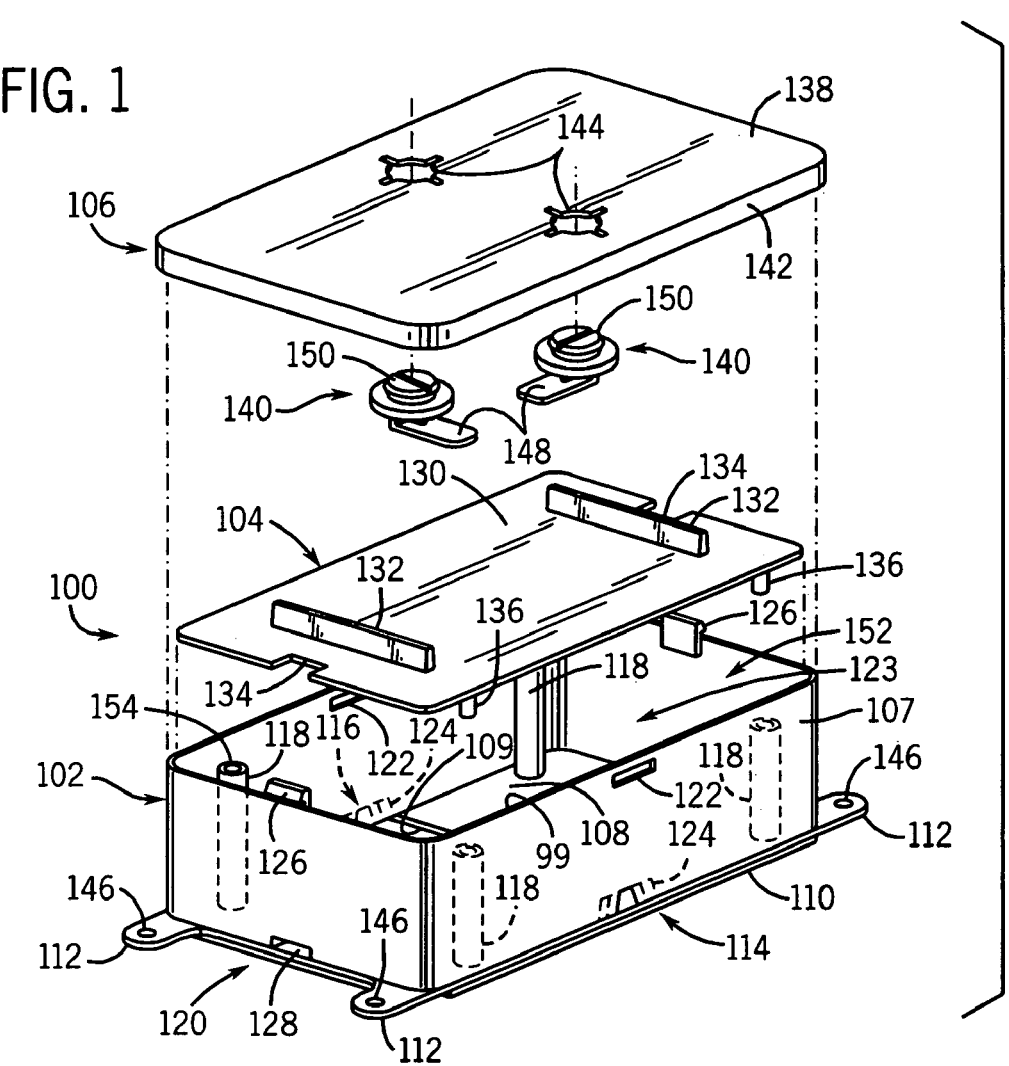

US 7,377,072 B2

BAIT STATION

CROSS-REFERENCE TO RELATED APPLICATIONS

Not applicable

STATEMENT REGARDING FEDERALLY SPONSORED RESEARCH/DEVELOPMENT

Not applicable

BACKGROUND OF THE INVENTION

The present invention relates to bait stations for controlling unwanted pests, such as termites. More specifically, it relates to bait stations that (i) permit one to monitor feeding progress, and (ii) to vary the capacity of the station once feeding has begun, with minimum adverse effect on the feeding as a result thereof.

In many areas of the world homes and businesses experience pest infestations such as termite infestations and other crawling insect infestations. Termites not only nest in buildings, they also tend to destroy those buildings over time as they feed on wood.

Controlling termites in buildings can be difficult as termites tend to burrow deep into wood structures. Hence, merely placing a toxic bait at a random position in a room would normally be ineffective in controlling termites, particularly if the toxic material is fast acting. In this regard, termites may find the entire wood structure of the building to be an equally desirable "bait", and thus may not be significantly influenced by yet another randomly positioned cellulose source (especially if it is not convenient to their normal path of travel). Further, even if a particular termite happens to feed on a toxic bait, that may do little to control the remaining population if the termite dies quickly near the bait.

One approach for controlling termites that has had some success takes advantage of the fact that termites often repetitively travel along a given preferred pathway, and the fact that termites often ingest the food, and then later regurgitate it along that pathway or at their nest. Hence, a bait can be positioned along a frequently used termite "trail", and be provided with a slower acting toxicant. "Termite trail" is used to refer to both enclosed termite tunnels and also at least partially open trails.

Positioning of a bait station adjacent a trail, which may be visible along a stucco wall for example, improves the likelihood that the termite will choose to feed at a bait station. Further, the use of the slower acting toxicant helps insure that termites that feed at the station will not immediately be killed at the station. Rather, there will be enough time for the termite to return to the nest and/or trail and regurgitate at those sites. Then, other termites will be likely to encounter the regurgitated bait and feed on it.

A complicating factor in designing bait stations that use this approach is that termites tend to avoid light and also prefer relatively constant environmental conditions (e.g. temperature; humidity) when feeding. When they are faced with a sudden light source, or an altered environmental condition, they scatter to a known safer place. This can be particularly problematic when one wants to check a bait station to determine if the bait has been used up or if alternatively no termites have been attracted.

In U.S. Pat. Nos. 6,058,646 and 6,079,151 there was disclosed a termite bait station in the form of a box-like housing that was positioned against selected walls or floors. The bottom of the housing had an entry positionable adjacent a termite trail. The interior of the housing contained an edible toxic material for controlling the termites. A removable cover was provided to allow for inspection of the housing interior and/or assembly of a second stacked housing.

However, upon removal of the exterior cover, the interior of the housing and associated bait would be exposed to ambient conditions. Thus, even if the cover were removed in extremely low light conditions, termites feeding inside the housing could be "spooked" by a rush of fresh or different temperature or humidity air caused by the cover removal. Thus, inspecting the cavity interior to see if the station was working, and/or whether the bait was completely consumed, could disrupt the function of the station.

As such it can be seen that a need still exists for improved bait stations, particularly those stations that allow for monitoring of the station and expanding of its capacity, both without significantly adversely affecting on-going feeding.

BRIEF SUMMARY OF THE INVENTION

In one aspect the invention provides a bait station having a housing suitable to contain bait for a pest (preferably a termite or other crawling insect). The housing has an entry to permit the pest to enter and access the bait if the bait is positioned in the housing. The housing also has an open (preferably outward) end.

A window is positioned so as to cover over at least a portion of the open end of the housing, and a lid is mountable to the housing so as to essentially cover the window. The lid can be moved from a first position where light is inhibited by the lid from passing through the window from outside the housing to a second position where the housing interior can be inspected through the window. The window is movable relative to the housing and also relative to the lid.

In preferred forms, the window, when mounted to cover the open outward end of the housing, restricts air entry into an interior of the housing through the open end. This is particularly important when the pest is a termite, the bait is a cellulosic material, and the station is configured to cover a portion of a termite trail. The housing can be in the form of a five-sided box with one of the sides being a base, and two openings being provided on opposed ends of the box adjacent the base to accommodate a termite trail.

In particularly preferred forms the window can be a transparent or translucent wall and the lid can be completely opaque. The window permits viewing of the bait and termite activity relative thereto, without disturbing the environment around the bait. When the lid covers the window it preferably will block essentially all light from passing through the window to the baiting area.

The window is movable such that bait can be added to the interior of the housing. It can be a separate part, or it can be connected by a living hinge to the housing.

In another aspect the invention provides a kit for alternatively assembling a bait station in either a stacked or unstacked assembly. The kit has a first housing suitable to contain bait for a pest. The first housing also has an entry to permit the pest to enter the first housing and access the bait if bait is positioned in the first housing interior. The first housing also has an open outward end. A window and a lid are also provided.

A second housing is provided having opposed open ends (one outward and one inward). The second housing is positionable to create a stacked array by being positioned against the first housing's outward end when an inward end of the second housing is positioned adjacent the first housing's outward end. The second housing also is configured so that it may contain bait for a pest in its interior.

The window can be alternatively positioned to cover over either the open outward end of the first housing or the open outward end of the second housing. The lid can be positioned adjacent the window and can be moved from a first position where an interior of a housing can be viewed through the window to a second position where that interior cannot be viewed through the window (and light is inhibited from passing through the window).

In preferred forms the window, when mounted to cover an open end of a specified housing, restricts air entry into the interior of that housing through that open end, the first housing is in the form of a five-sided box with one of the sides being a base, two openings are provided on opposed ends of the box adjacent the base (e.g. to accommodate trail), the window is a transparent or translucent wall, and the lid is opaque. In preferred use a termite bait and a termite control active ingredient are positioned in an interior of at least one of the housings.

In another aspect the invention provides methods for controlling termites. One obtains a bait station of the above type. One then places the bait station adjacent a termite trail. One may then move the lid to monitor the status of the bait, and thereafter move the lid again to create a darkened interior of the housing adjacent the bait.

In preferred aspects of these methods there may also be a further step of removing the window and lid from a first housing, mounting a second housing on the first housing to create a stacked assembly, and then mounting the window and lid on the second housing. This would be desirable if one learned the bait was not completely, but was almost, used up in the first housing. One could then stack on a second bait source, without having to continuously monitor the first housing to determine exactly when it has been completely used up.

Yet another possible variant of the method includes the additional step of removing the window and lid to provide access to a housing interior, and then adding additional bait to the housing. One then replaces the window and lid.

The present invention therefore provides bait stations that can be monitored with minimal disturbance to termites or other pests, and methods for using them. The capacity of these stations can be expanded quickly (e.g. if the station is particularly successful). The stations can be manufactured inexpensively, and easily assembled/installed. Further, they are suitable to be affixed by screws or other means to vertical or horizontal walls, thereby providing great flexibility in use.

The foregoing and other advantages of the present invention will be apparent from the following description. In that description reference is made to the accompanying drawings which form a part thereof, and in which there is shown by way of illustration, and not limitation, preferred embodiments of the invention. Such embodiments do not necessarily represent the full scope of the invention, and reference should therefore be made to the claims herein for interpreting the scope of the invention.

BRIEF DESCRIPTION OF THE DRAWINGS

FIG. 1 is an exploded perspective view of a bait station of the present invention;

FIG. 2 is an assembled view of the FIG. 1 bait station, taken from the same perspective as shown in FIG. 1, albeit with a termite trail environment also shown;

DETAILED DESCRIPTION OF THE PREFERRED EMBODIMENTS

Figure 3:
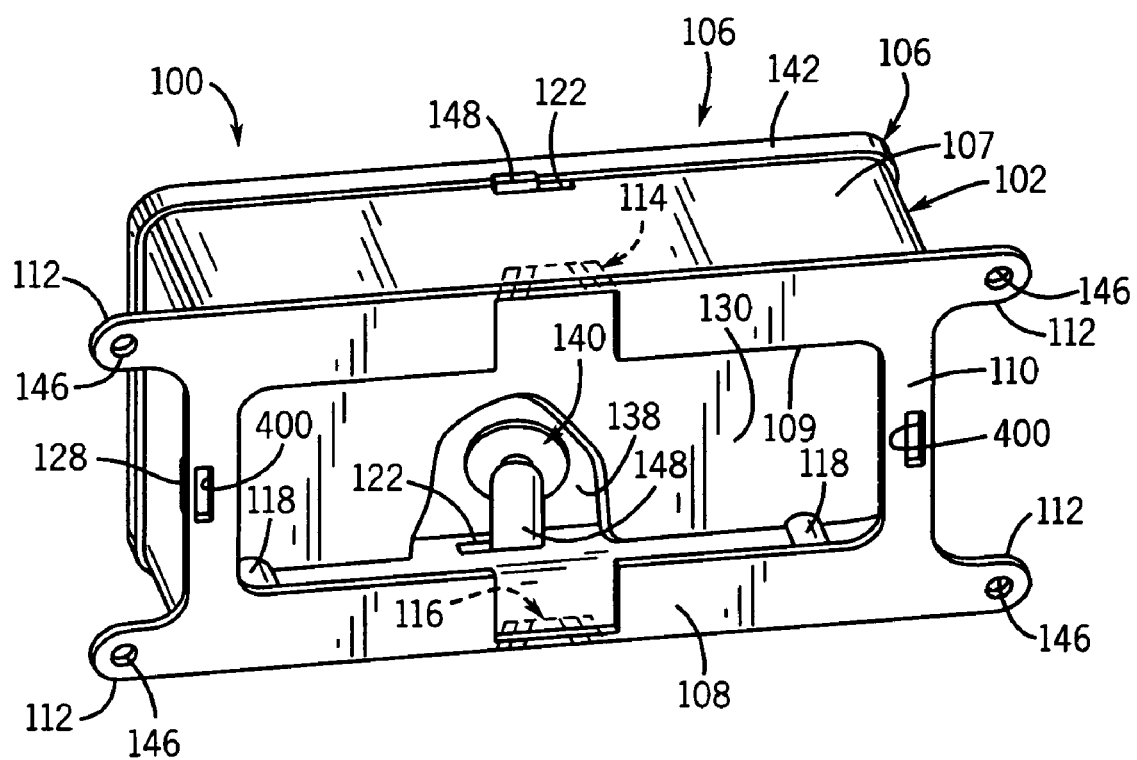
FIG. 3 is a bottom perspective view of the FIG. 1 bait station.

FIG. 1 shows an unassembled termite bait station 100 having a housing 102, a window 104, and a lid 106. Lid 106 may be a rigid, plastic, opaque structure mountable on an open end 99 of the housing 102. The window 104 may be made of transparent glass, but may instead be made of a variety of other transparent or translucent materials such as plastics. Window 104 may also be slightly smoked or colored to further reduce the transmittal of certain light frequencies that are the most disturbing to termites.

The lid 106 can be attached to the housing 102 by frictional engagement, or by snaps, buttons, hook-and-eye fasteners or the like. Lid 106 may be separately formed from the housing 102, or where only one housing is used be attached by a living or other hinge arrangement to the housing 102 (not shown).

Housing 102 includes a sidewall 107, a planar base 108 from which the sidewall upwardly extends, a base entry 109, an adhesive layer 110, mounting tabs 112, a first opening 114, a second opening 116, window supports 118, connection means 120 (see also 126/128), and lid fastener slots 122. The housing has an interior cavity 123 for receiving the bait. Each opening 114, 116 in a sidewall 107 may initially be open to define a path 200 (FIG. 2) or may initially be closed by removable perforated sections 124 that can be individually removed to create (or enlarge) path 200 to accommodate a termite trail.

At the upper edge of the housing 102 are stacking tabs 126 which are designed to fit into corresponding slots 128 when the housings are stacked on each other. Window 104 includes a plate section 130, handles 132, clearance notches 134 and posts 136. Lid 106 includes a main plate section 138, lid fasteners 140, a lip 142, and fastener mount apertures 144.

Each mounting tab 112 has an aperture 146. Each lid fastener 140 includes a fastener arm 148 and a knob 150, the fastener knob being so shaped or textured as to allow ready turning, either by hand or by the use of a coin in a slot, a screw driver, or the like.

Housing 102 can be affixed to a floor 202, vertical wall, or the like, and in any event holds bait 204 in cavity 123 for feeding and poisoning termites 208. Base 108 on the bottom of the housing 102 is coupled to sidewall 107. Sidewall 107 extends upward from the periphery of base 108. Base 108 and sidewall 107 together form the five sided body of the housing and define the interior bait cavity 123.

Sidewall 107 defines an outward end opening 152 into the bait chamber into which window 104 is mounted, and through which additional bait may be added when the window is moved out of the way. When the window is in the fully assembled position, it acts to essentially close off the interior of the housing from ambient air coming from the opposite side of the window. Nevertheless, one can view the status of the bait through the window.

In an alternative configuration (not shown), sidewall 107 may extend inwardly somewhat at its top to reduce the size of opening 152. However, the window should still at least cover a portion of the open end.

Each of the four mounting tabs 112 and adhesive layer 110 may be configured to facilitate affixing housing 102 to the floor 202

Adhesive layer 110 is fixed to the bottom of base 108, and preferably covers the majority of the area of base 108. Adhesive layer 110 may be initially provided with a release paper (not shown) that the user peels off to expose a sticky bottom surface.

Figure 4:
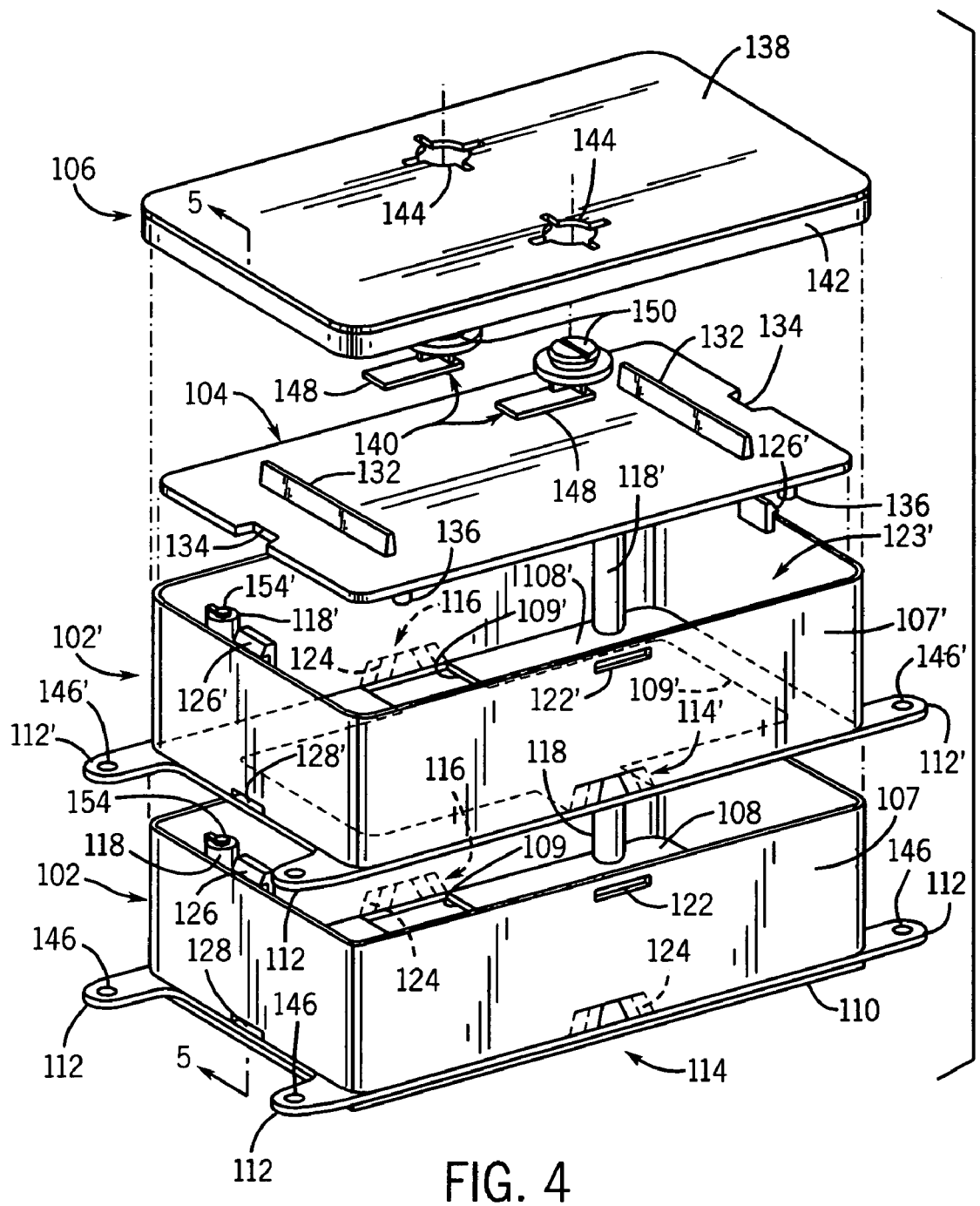
FIG. 4 is an exploded perspective view of another embodiment of the present invention, having two baiting housings stackable one upon the other.
Figure 5:
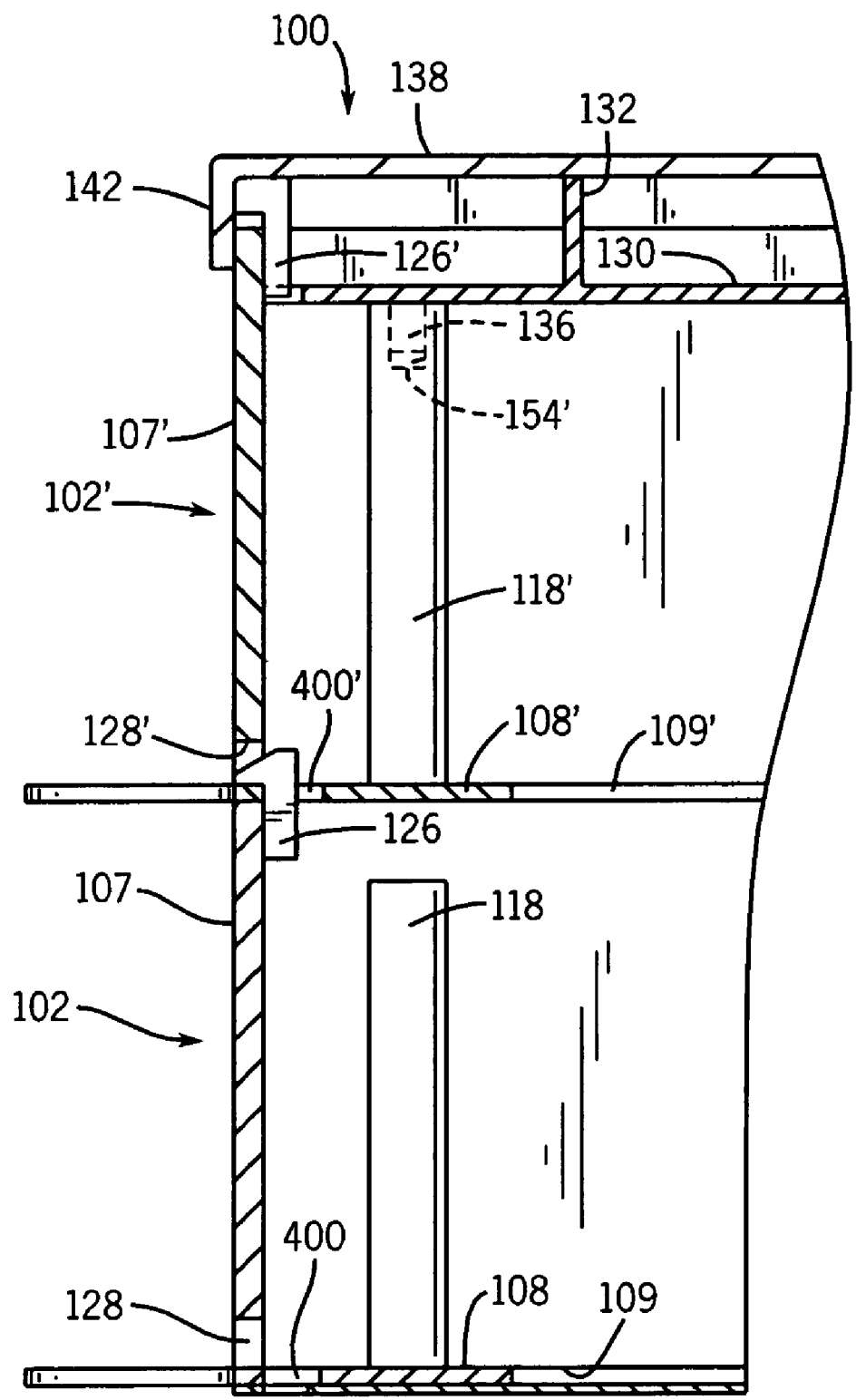
FIG. 5 is a partial cross sectional view taken substantially along line 5-5 of FIG. 4 once the FIG. 4 structure has been fully assembled.

Connection means 120 are used to fix two housings 102, 102' together (see FIG. 3). In this regard, stacking tabs 126 extend upward from a top edge of sidewall 107 on opposite sides of housing 102 and are configured to extend through a slot 400' (FIG. 5) in the bottom of an identically constructed abutting second housing 102' (FIGS. 3-5). Note also the similar slots 400 on the first housing 102. The tabs 126 each engage a slot 128' of housing 102'.

Four supports 118 protrude from the sidewall 107 and planar base 108 of the housing 102, and extend from the planar base upward to within 4.0 to 8.0 millimeters of the opening 152. The supports are located adjacent to the four corners of housing 102. Each such support has a hole 154 in the top of the support of sufficient size and shape to receive a post 136, and thereby support window 104. Window 104 is press-fit into the housing 102 by aligning the window posts 136 with the post holes 154 on window supports 118 while holding the window substantially parallel with the opening 152, then pushing down on the window until the posts are secured to the post holes.

Clearance notches 134 are located in opposite ends of the plate section 130, such that when the window 104 is pressed down, plate section 130 clears stacking tabs 126. To remove window 104, the user grasps the handles 132 and pulls the window upward, pulling posts 136 out of post holes 154. The handles 132 also may be employed to hold the main plate section 138 away from the plate section 130 and provide more structural strength to the window 104 and lid 106.

Lid 106 is preferably opaque to completely block light from entering the cavity 123 when it is covering the window and housing opening. In this regard, the main plate section 138 of lid 106 extends completely across the window 104 parallel with plate section 130 when the parts are in their normal position.

Lid fasteners 140 are mounted in the fastener mount apertures 144 such that each fastener knob 150 extends outside the cover plate and is accessible by the user. Fastener arm 148 is coupled to the fastener knob 150 and extends generally coplanar with and between main plate section 138 and plate section 130. When the user rotates fastener knob 150, fastener arm 148 pivots to engage and disengage with slots 122 in sidewall 107 of housing 102.

To attach lid 106 and block light from the cavity 123 the user aligns the lid 106 with the housing 102 and presses the lid downward onto the housing firmly. Lip 142 extends over the edge of the housing 102 and turns downward, enclosing opening 152. The user then rotates the fastener knobs 150, causing the fastener arms 148 to pivot into the lid fastener slots 122 located on the sidewall 107 of the housing 102. This locks lid 106 onto housing 102. Light is thereby blocked from entering bait cavity 123 through window 104 by the opaque main plate section 138.

While the housing is unassembled (FIG. 1) the user fills the bait cavity 123 with bait 204, preferably through the opening 152. The bait 204 is preferably an attractant made of cellulose fiber or wood pellets, mixed with a termite control active ingredient.

In this regard, certain fungal and/or bacterial materials are known to be particularly effective termite control active ingredients. For example, Mycopesticide LLC of Shelton, Wash. sells a Metarhizium anisopliae preparation for this purpose. Some synthetic insecticides may also be useful as effective termite control active ingredients. These include but are not limited to Indoxacarb (sold by E. I. du Pont de Nemours and Company) and Fipronil (sold by Rhone Poulenc AG Company).

Chitin synthesis inhibitors can also be usefully employed for this purpose. A chitin synthesis inhibitor prevents the termite from forming a new exoskeleton during the natural molting process, thereby killing the termite. This is a desirable "slow" acting system. Common chitin synthesis inhibitors include diflubenzuron, chlorfluazuron, hexaflumuron, and noviflumuron. Our wood fiber bait 204 is most preferably impregnated with a 0.5% by weight solution of hexaflumuron solution, which is a benzylurea insecticide.

The termite trail 206 is shown as formed by termites 208 from regurgitated cellulose and is relatively thin and opaque. The path 200 preferably partially surrounds the termite trail 206, therefore affixing the bait station 100 to the structure in a way that does not initially break or harm the termite trail.

FIG. 2 shows a termite 208 which has sensed the bait 204, eaten a hole 214 through outer wall of the trail 206, entered the bait cavity 123 through the base entry 109, and is searching for the bait. However, there is very little bait left as shown in FIG. 2. In accordance with the present invention the consumer can nevertheless check the amount of bait 204 remaining in the bait cavity 123 simply by removing the lid 106.

Lid removal is relatively fast and can be done when the surrounding area is fairly, but not completely dark. The status of the bait can then be viewed without materially changing the humidity level or temperature in the bait station. Admittedly, there will be some light reaching the bait cavity 123 when monitoring occurs. However, it occurs for only a brief period while the user does a quick visual check. Further, appropriate smoking or tinting of the window can remove particularly problematic light frequencies.

If there is insufficient bait 204 in the bait cavity 123, the user can either remove the window 104 and fill the bait cavity 123 with more bait through the opening 152, or remove the window and stack another pre-filled housing 102' on top of the existing housing 102, as seen in FIG. 3. if no activity is seen in the station during this monitoring, the station can be moved to a possibly more productive position.

In FIG. 3 a second housing 102' is shown with parts that are comparable to the first housing identified with a prime (e.g. 102 versus 102'). Note that the second housing 102' can be assembled on the first without removing the first housing from the floor 202. The user merely removes the lid 106 from the housing 102 by first rotating the fastener knobs 150, causing the fastener arms 148 to pivot away from and out of the lid fastener slots 122, and then pulling the lid off the housing.

The user then removes the window 104 from the housing 102 by grasping the handles 132 and pulling the posts 136 out of the post holes 154. The user then aligns the second housing 102' above the first housing 102 such that slots 128' and slots 400' (FIG. 4) on the second housing are immediately above the stacking tabs 126 on the first housing.

Once the housings are in this relative position, the user can press the second housing 102' down, causing the tabs 126 to snap into the slots 128', coupling the second housing 102' to the first housing 102. This coupled together arrangement is best shown in FIG. 5. The user then press fits window 104 onto the second housing 102' and then screws the lid 106 onto housing 102'. Because of the large base opening 109' in the second housing 102', the interiors of the housings 102, 102' are then essentially contiguous and the housings are in interior communication. This permits termites who have essentially eaten up all the bait in the first housing 102 to be enticed into feeding on the bait in second housing 102'.

Importantly, the process of stacking a new bait station on top of an existing mounted bait station does not disrupt the termite trail. The stacking procedure is also relatively quick, thereby minimizing the environmental disturbance of termites.

Figure 6:
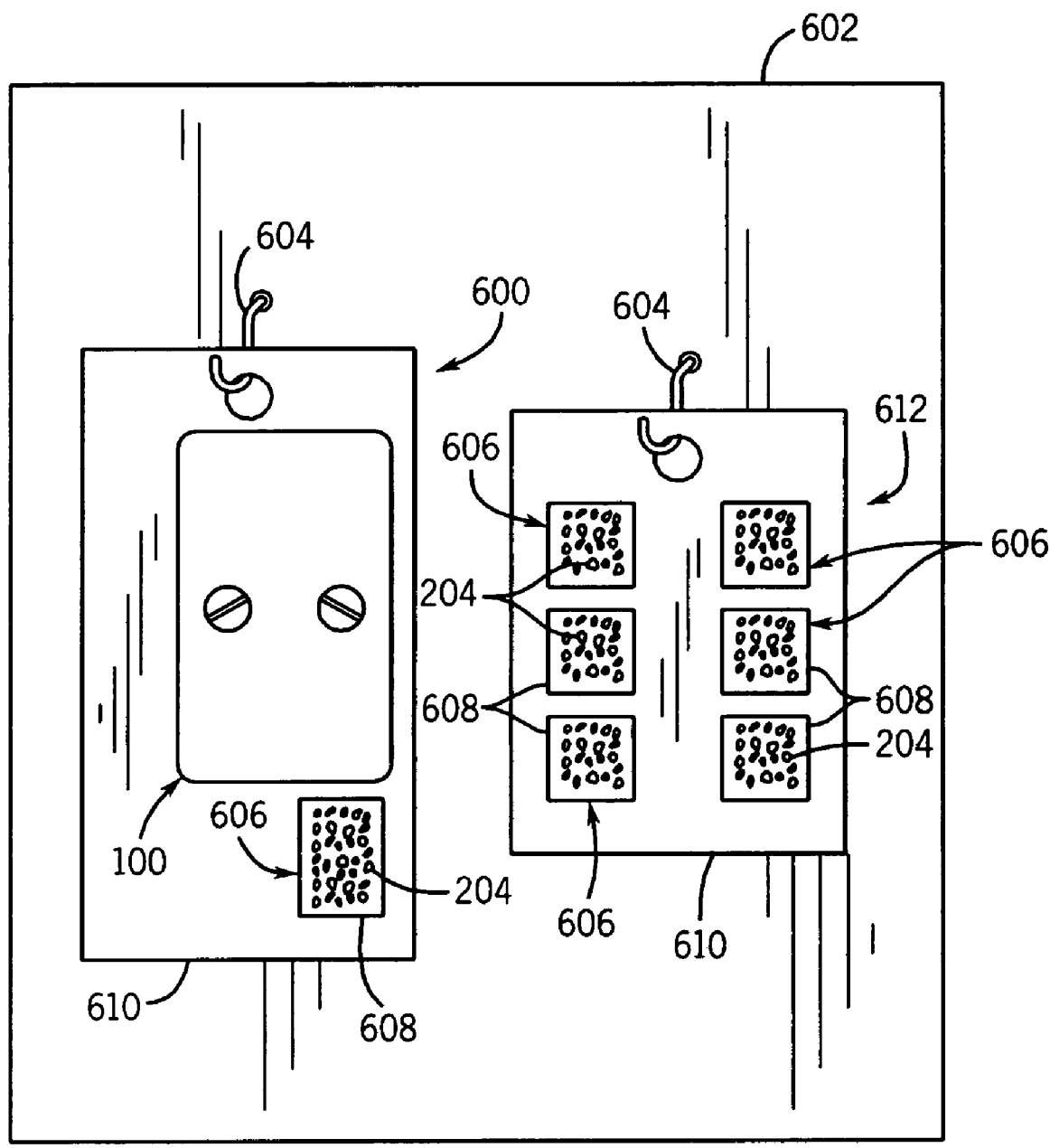
FIG. 6 is a front view of a point-of-sale rack containing a termite control kit and refill kit.

In FIG. 6 a termite control kit 600 is shown hanging from a point-of-sale rack 602 by a hook 604. The kit 600 includes a bait station 100 and a refill 606. The refill 606 includes termite bait 204 and a bait bag 608. The bait bag 608 keeps the bait 204 fresh, and therefore hermetically seals the bait. The bait bag 608 is preferably of material that will resist diffusion through the bag wall, such as Mylar, foil or plastic. An alternative refill kit 612 for refilling existing bait stations includes a package 610 enclosing one or more refills 606, but not including a bait station 100.

While the present invention has been described above with reference to what are currently considered to be its preferred embodiments, it is to be understood that the invention is not limited to just those specific embodiments. For example, the bait station could be designed for use with other pests (e.g. preferably other crawling insects such as cockroaches). In such a case, the baiting material and the toxin would be correspondingly altered to be optimized for the insect being targeted. In another variant, openings 114, 116 may instead include a slidable panel, a bendable panel or a hinged panel, or be deleted entirely.

Thus, the invention is intended to cover a wide variety of modifications within the spirit of the appended claims. Hence, the claims are not to be limited to just the preferred embodiments.

INDUSTRIAL APPLICABILITY

The present invention provides single and multiple housing bait stations for controlling termites and other crawling insects, and methods for their use, where the stations permit monitoring of the bait and altering bait capacity with minimal disruption of feeding.

We claim:

1. A bait station, comprising:

a housing suitable to contain bait for a pest, the housing having an entry to permit the pest to enter the housing and access the bait if the bait is positioned in the housing, the housing further having an open end;

a window positioned so as to cover over at least a portion of the open end of the housing; and a lid mountable to the housing so as to essentially cover over the window;

wherein the lid can be moved from a first position where an interior of the housing can be viewed through the window to a second position where light is inhibited from passing from outside the housing through the window into the interior of the housing; and wherein the window is movable relative to the housing and also movable relative to the lid;

wherein the pest is a termite, the bait comprises a cellulosic material, and the station is configured to be suitable to cover a portion of a termite trail; and wherein the housing is a five-sided housing with a side of the housing being a base, and with two openings being provided on opposed ends of the housing adjacent the base.

2. The bait station of claim 1, wherein the window, when mounted to cover over said portion of the open end of the housing, restricts air entry into an interior of the housing through the open end.

3. The bait station of claim 1, wherein the lid is opaque.

4. The bait station of claim 1 wherein bait can be added to an interior of the housing when the lid is in said first position if the window is moved to a position permitting access to that interior.

5. The bait station of claim 1, further comprising a termite bait and a termite control active ingredient.

* * * * *